(12) United States Patent
Breu et al.

(10) Patent No.: US 12,166,246 B2
(45) Date of Patent: Dec. 10, 2024

(54) ELECTRIC ENERGY SYSTEM WITH FUEL CELLS

(71) Applicant: AUDI AG, Ingolstadt (DE)

(72) Inventors: Martin Breu, Heilsbronn (DE); Maximilian Schiedermeier, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 741 days.

(21) Appl. No.: 17/260,968

(22) PCT Filed: Apr. 24, 2019

(86) PCT No.: PCT/EP2019/060406
§ 371 (c)(1),
(2) Date: Jan. 15, 2021

(87) PCT Pub. No.: WO2020/015875
PCT Pub. Date: Jan. 23, 2020

(65) Prior Publication Data
US 2021/0328312 A1  Oct. 21, 2021

(30) Foreign Application Priority Data
Jul. 17, 2018 (DE) ............ 10 2018 211 815.9

(51) Int. Cl.
*H01M 50/579* (2021.01)
*B60L 50/75* (2019.01)
*B60L 58/40* (2019.01)
*H01M 10/42* (2006.01)
*H01M 16/00* (2006.01)
*H01M 50/574* (2021.01)

(52) U.S. Cl.
CPC ........... *H01M 50/579* (2021.01); *B60L 50/75* (2019.02); *B60L 58/40* (2019.02); *H01M 10/425* (2013.01); *H01M 16/006* (2013.01); *H01M 50/574* (2021.01); H01M 2010/4271 (2013.01); H01M 2220/20 (2013.01); H01M 2250/20 (2013.01)

(58) Field of Classification Search
CPC ............. H01M 50/579; H01M 10/425; H01M 16/006; H01M 2010/4271; H01M 2220/20; H01M 2250/20; B60L 50/75; B60L 58/40
See application file for complete search history.

(56) References Cited

U.S. PATENT DOCUMENTS

| 4,670,702 A | 6/1987 | Yamada et al. |
| 2007/0023215 A1* | 2/2007 | Ueda ............ B03B 9/06 |
| | | 180/167 |

(Continued)

FOREIGN PATENT DOCUMENTS

| DE | 102 61 418 A1 | 7/2004 |
| DE | 20 2007 011 894 U1 | 1/2008 |

(Continued)

OTHER PUBLICATIONS

Maier, DE 102016012849 Esapcenet machine translation, 2016 (Year: 2016).*

(Continued)

*Primary Examiner* — Wyatt P McConnell
(74) *Attorney, Agent, or Firm* — Seed IP Law Group LLP

(57) ABSTRACT

An electrical energy system containing fuel cells and a method for operating an electrical energy system for a motor vehicle are provided.

7 Claims, 1 Drawing Sheet

(56) References Cited

U.S. PATENT DOCUMENTS

| | | | | |
|---|---|---|---|---|
| 2008/0030164 A1* | 2/2008 | Okuto | ............... | H01M 16/006 |
| | | | | 429/442 |
| 2012/0019209 A1* | 1/2012 | Fink | ................ | B60L 58/10 |
| | | | | 320/116 |
| 2016/0336559 A1* | 11/2016 | White | ................ | B25F 5/02 |

FOREIGN PATENT DOCUMENTS

| | | | |
|---|---|---|---|
| DE | 10 2007 050 377 A1 | | 4/2009 |
| DE | 10 2009 027 220 A1 | | 12/2010 |
| DE | 102016012849 A1 | * | 4/2017 |
| JP | 8-163711 A | | 6/1996 |
| JP | 3026013 B2 | | 3/2000 |
| JP | 2002-165309 A | | 6/2002 |
| JP | 2004-7919 A | | 1/2004 |
| JP | 2006-327251 A | | 12/2006 |
| JP | 2016-220363 A | | 12/2016 |
| WO | 2004/082051 A1 | | 9/2004 |
| WO | WO-2017096464 A1 * | 6/2017 | .......... H01M 10/425 |

OTHER PUBLICATIONS

Hiroaki, JP H03272568 Espacenet machine translation, 2000 (Year: 2000).*

* cited by examiner

ELECTRIC ENERGY SYSTEM WITH FUEL CELLS

BACKGROUND

Technical Field

Embodiments of the invention relate to an electrical energy system containing fuel cells and a method for operating an electrical energy system for a motor vehicle.

Description of the Related Art

In addition to the fuel cell circuit, the energy system of a fuel cell vehicle typically comprises an HV (high voltage) battery circuit (traction circuit) from which HV loads, such as the one or more pulse inverters and the electric motors connected thereto and other loads, such as heater or other fuel cell auxiliary units, are supplied with energy.

DE 10 2009 027 220 A1 discloses a device for supplying an electric drive for a motor vehicle with a power network connected to the drive and which has a fuel cell unit and an energy storage system, wherein the fuel cell unit and the energy storage system are coupled. A first inverter is arranged between the fuel cell unit and the drive, a second inverter is arranged between the energy storage system and the drive.

DE 20 2007 011 894 U1 discloses a combined drive unit in which a fuel cell and a secondary voltage source are coupled to a drive unit via a common control unit.

Due to different development priorities, the fuel cell system and the HV battery are often developed separately and accordingly also installed in separate housings. This means that there is a separate switch-on/off box for both the fuel cell system and the HV battery, namely an FCJB (Fuel Cell Junction Box) for the fuel cell system and a BJB (Battery Junction Box) for the HV battery. Two similar switch-on/off boxes are therefore installed in the vehicle. This results in additional costs. Furthermore, these two switch-on/off boxes require a non-negligible space and cause an increase in weight of a few kilograms.

EP 1 632 004 A1 describes an arrangement for the wireless supply of a field apparatus with electrical energy in a process engineering system. In the field apparatus, at least one fuel cell and an electrical energy storage system are integrated in a housing.

BRIEF SUMMARY

Embodiments of the present invention provide devices and methods which at least partially eliminate the outlined disadvantages.

According to some embodiments of the invention, a common switch-on/off unit (HVJB—High Voltage Junction Box) can be utilized by the integration of the HV battery and the fuel cell system in a common unit.

The subject matter of some embodiments of the invention is an energy system for a vehicle, which energy system comprises at least one fuel cell and at least one HV battery, which are coupled to an electric circuit (traction circuit or intermediate circuit) via a common switch-on/off unit (High Voltage Junction Box—HVJB), which electric circuit supplies electric loads connected thereto with electrical energy. Electric loads are, for example, pulse inverters and electric motors connected thereto, or other HV components, such as auxiliary units of the fuel cell, chargers, 12 V DC/DC converters, HV heaters, electric air conditioning compressors, etc.

In an embodiment of the energy system, the at least one fuel cell and the at least one HV battery are arranged in a common housing. In doing so, no external HV lines are necessary between the two energy sources and a common switch-on/off unit (HVJB) can be used. In a further embodiment, the common switch-on/off unit is also arranged in the common housing. However, a partial integration or add-on solution for the two HV energy sources is also possible.

In an embodiment of the energy system, the common switch-on/off unit comprises at least one electromechanical switching element, in particular a contactor.

In a further embodiment of the energy system, the common switch-on/off unit comprises at least one semiconductor switch, for example at least one IGBT or a MOS-FET.

In a further embodiment of the energy system, the common switch-on/off unit comprises at least one pyrotechnic short-circuit element which is adapted to ignite in the event of an accident of the motor vehicle and to disconnect the at least one fuel cell and the at least one HV battery from said electric circuit (traction circuit or intermediate circuit) to which they are coupled.

In a further embodiment of the energy system, the common switch-on/off unit comprises at least one insulation monitor.

An energy system according to some embodiments of the invention offers the advantage that the main components of the switch-on/off boxes (contactors, pre-charging, pyro-separator, insulation monitor, current and voltage measuring devices etc.) no longer need to be installed twice in the vehicle and thereby can also be utilized much better.

The advantages of the energy systems described herein include weight and space savings, a reduction in the number of components and a better utilization of the components, a reduced system complexity, a reduction of the cabling costs and control effort for the switch-on/off boxes and a lowering the total cost of the energy system.

A method for operating an energy system includes connecting at least one fuel cell and the at least one HV battery to an electric circuit via a common switch-on/off unit, electrical loads being connected to said electric circuit (traction circuit or intermediate circuit).

In an embodiment of the method, the at least one fuel cell and the at least one HV battery are disconnected from said electric circuit via the common switch-on/off unit if a critical overvoltage, a short circuit or another critical condition occurs in the energy system or the vehicle meets with an accident. This avoids consequential damage caused by high voltage flashovers.

In a further variant, the at least one fuel cell and the at least one HV battery are reversibly connected to the traction circuit or disconnected from it via the common switch-on/off unit. For example, when the vehicle is started up, the fuel cell and HV battery can be connected to the traction circuit and disconnected again when the vehicle is switched off in order to avoid risks caused by high voltage.

It should be understood that the features mentioned above and those yet to be explained below can be used not only in the respectively specified combination, but also in other combinations or on their own, without departing from the scope of the present disclosure.

BRIEF DESCRIPTION OF THE SEVERAL VIEWS OF THE DRAWINGS

Embodiments of the invention are schematically illustrated in the drawings based on embodiments and are described further with reference to the drawings.

DETAILED DESCRIPTION

Figure 1:
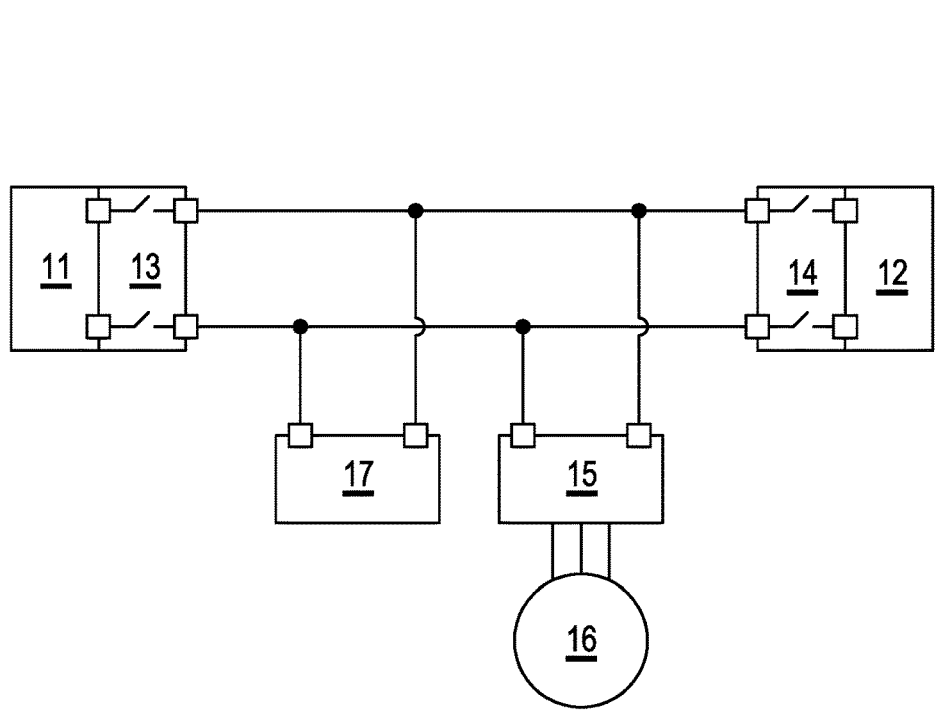
FIG. 1 shows a schematic illustration of an energy system with connected loads.

FIG. 1 shows a schematic illustration of an energy system with connected loads 15, 16, 17. The energy system 10 comprises a fuel cell 11 and an HV battery 12 as energy sources. They are connected to the traction circuit in each case via an associated switch-on/off unit 13, 14, the fuel cell 11 being connected via an FCJB (Fuel Cell Junction Box) 13 and the HV battery 12 via a BJB (Battery Junction Box) 14. Pulse inverters 15 and electric motors 16, and other HV components 17, such as auxiliary units of the fuel cell, chargers, 12 V DC/DC converters, HV heaters, electric air-conditioning compressors, etc., are connected to the traction circuit.

Figure 2:
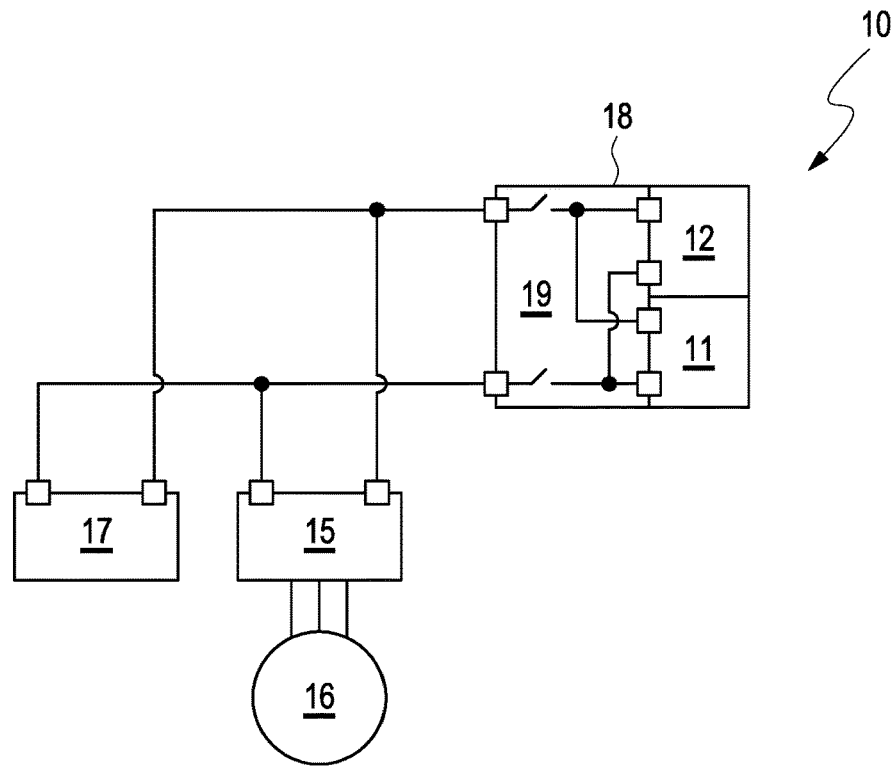
FIG. 2 shows a schematic illustration of an embodiment of an energy system with connected loads.

FIG. 2 shows a schematic illustration of an embodiment of the energy system 10 with connected loads 15, 16, 17. The energy system 10 comprises, as energy sources, a fuel cell 11 and an HV battery 12, which are integrated in a common housing 18 in which a common switch-on/off unit (HVJB) 19 is located also. HVJB 19 can be used to connect BZ 11 and HV battery 12 to the traction circuit or to disconnect them therefrom. At least one pulse inverter 15 and at least one electric motor 16 are connected to the traction circuit of the energy system 10, as well as further HV components 17, such as ancillary units of the fuel cell, chargers, 12 V DC/DC converters, HV-heaters, electric air-conditioning compressors, etc.

The invention claimed is:

1. An energy system for a vehicle, comprising:
   at least one fuel cell; and
   at least one battery,
   wherein the at least one fuel cell and the at least one battery are reversibly coupled with an electric circuit via a common switch-on/off unit, said electric circuit supplying electrical loads connected thereto with electrical energy,
   wherein the common switch-on/off unit is configured to electrically connect the at least one fuel cell and the at least one battery to the electric circuit when the vehicle is started and to disconnect the at least one fuel cell and the at least one battery from the electric circuit when the vehicle is switched off,
   wherein the at least one fuel cell, the at least one battery, and the common switch-on/off unit are arranged in a common housing, and
   wherein the switch-on/off unit comprises at least one pyrotechnic short-circuit element which is adapted to ignite in the event of an accident of the vehicle and to disconnect the at least one fuel cell and the at least one battery from said electric circuit to which the at least one fuel cell and the at least one battery are coupled.

2. The energy system according to claim 1, wherein said switch on/off unit comprises at least one electromechanical switching element.

3. The energy system according to claim 1, wherein the switch-on/off unit comprises at least one semiconductor switch.

4. The energy system according to claim 3, wherein the switch-on/off unit comprises at least one IGBT or one MOS-FET.

5. The energy system according to claim 1, wherein the switch-on/off unit comprises at least one insulation monitor.

6. A method for operating an energy system for a vehicle comprising at least one fuel cell and at least one battery, wherein the at least one fuel cell and the at least one battery are reversibly coupled with an electric circuit via a common switch-on/off unit, the common switch-on/off unit comprising at least one pyrotechnic short-circuit element configured to ignite in the event of an accident of the vehicle and to disconnect the at least one fuel cell and the at least one battery from said electric circuit to which the at least one fuel cell and the at least one battery are coupled, said electric circuit supplying electrical loads connected thereto with electrical energy, and wherein the at least one fuel cell, the at least one battery, and the common switch-on/off unit are arranged in a common housing, the method comprising:
   electrically connecting the at least one fuel cell and the at least one battery to the electric circuit when the vehicle is started via the common switch-on/off unit;
   disconnecting the at least one fuel cell and the at least one battery from the electric circuit when the vehicle is switched off via the common switch-on/off unit; and
   disconnecting the at least one fuel cell and the at least one battery from the electric circuit via igniting the at least one pyrotechnic short-circuit element of the common switch-on/off unit when the vehicle meets with an accident.

7. The energy system according to claim 2 wherein the at least one electromechanical switching element includes a contactor.

* * * * *